(12) United States Patent
Snider et al.

(10) Patent No.: US 6,725,637 B2
(45) Date of Patent: Apr. 27, 2004

(54) WATER CRAFT FOR REDUCING AQUATIC PLANT INFESTATION

(76) Inventors: Trent G. Snider, P.O. Box 310, Gulf Hammock, FL (US) 32639; Danny G. Snider, P.O. Box 310, Gulf Hammock, FL (US) 32639; John J. Strickland, 12717 NW. 75th Ter., Alachua, FL (US) 32615

( * ) Notice: Subject to any disclaimer, the term of this patent is extended or adjusted under 35 U.S.C. 154(b) by 0 days.

(21) Appl. No.: 09/169,542

(22) Filed: Oct. 9, 1998

(65) Prior Publication Data
US 2002/0062634 A1 May 30, 2002

(51) Int. Cl.[7] ............................................... A01D 44/00
(52) U.S. Cl. ............................................................ 56/8
(58) Field of Search ............................................ 56/8, 9

(56) References Cited

U.S. PATENT DOCUMENTS

| | | | | |
|---|---|---|---|---|
| 2,486,275 A | * | 10/1949 | Grinwald | 56/8 |
| 2,677,926 A | * | 5/1954 | Washbourne et al. | 56/8 |
| 3,468,106 A | * | 9/1969 | Myers et al. | 56/9 |
| 3,890,771 A | * | 6/1975 | Kelpin | 56/9 |
| 4,196,566 A | * | 4/1980 | Donnelley | 56/8 |
| 5,142,849 A | * | 9/1992 | Amimoto et al. | 56/8 |
| 5,481,856 A | | 1/1996 | Wickoren et al. | |
| 5,542,240 A | | 8/1996 | Snider et al. | |
| 5,603,204 A | | 2/1997 | Harvey-Rioux et al. | |

FOREIGN PATENT DOCUMENTS

| | | | | |
|---|---|---|---|---|
| DE | 482822 | * | 9/1929 | 56/8 |
| DE | 237467 | * | 7/1986 | 56/8 |

* cited by examiner

Primary Examiner—Robert E. Pezzuto
Assistant Examiner—Meredith Petravick
(74) Attorney, Agent, or Firm—Timothy H. Van Dyke; Van Dyke & Assoc., P.A.

(57) ABSTRACT

A watercraft for reduces aquatic plant infestation by mulching or otherwise chopping plants growing on the surface of the water as the craft moves forward along a waterway. Specifically exemplified is an airboat having a hull with an intake port at the bow end of the craft whereby aquatic plant laden water enters the craft; an exhaust port whereby water and mulched aquatic plants are discharged; at least two vertically-oriented spindles having blades attached thereon, and at least one positionable and interchangeable blade assembly disposed in front of the intake port which may be raised, lowered and tilted as desired.

35 Claims, 18 Drawing Sheets

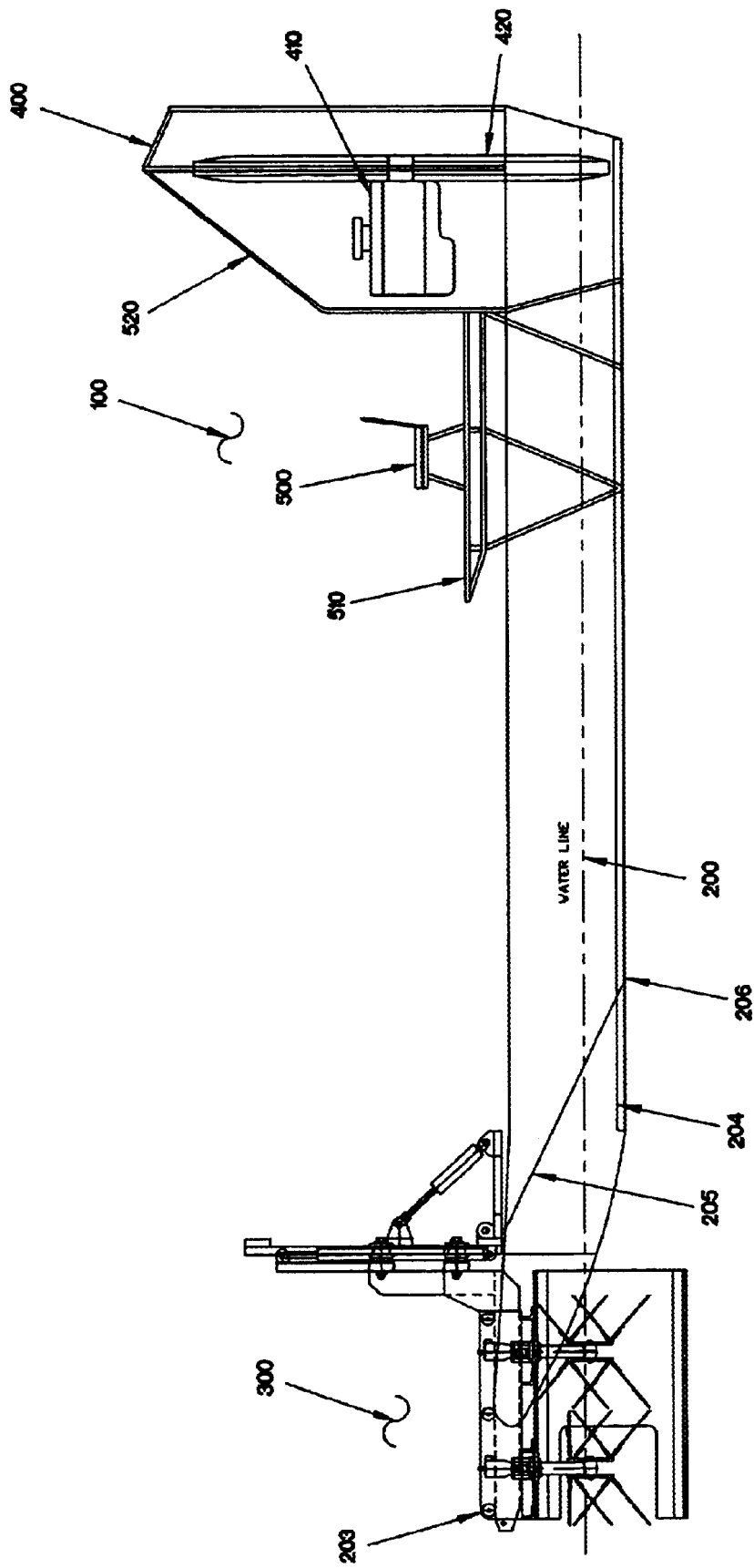

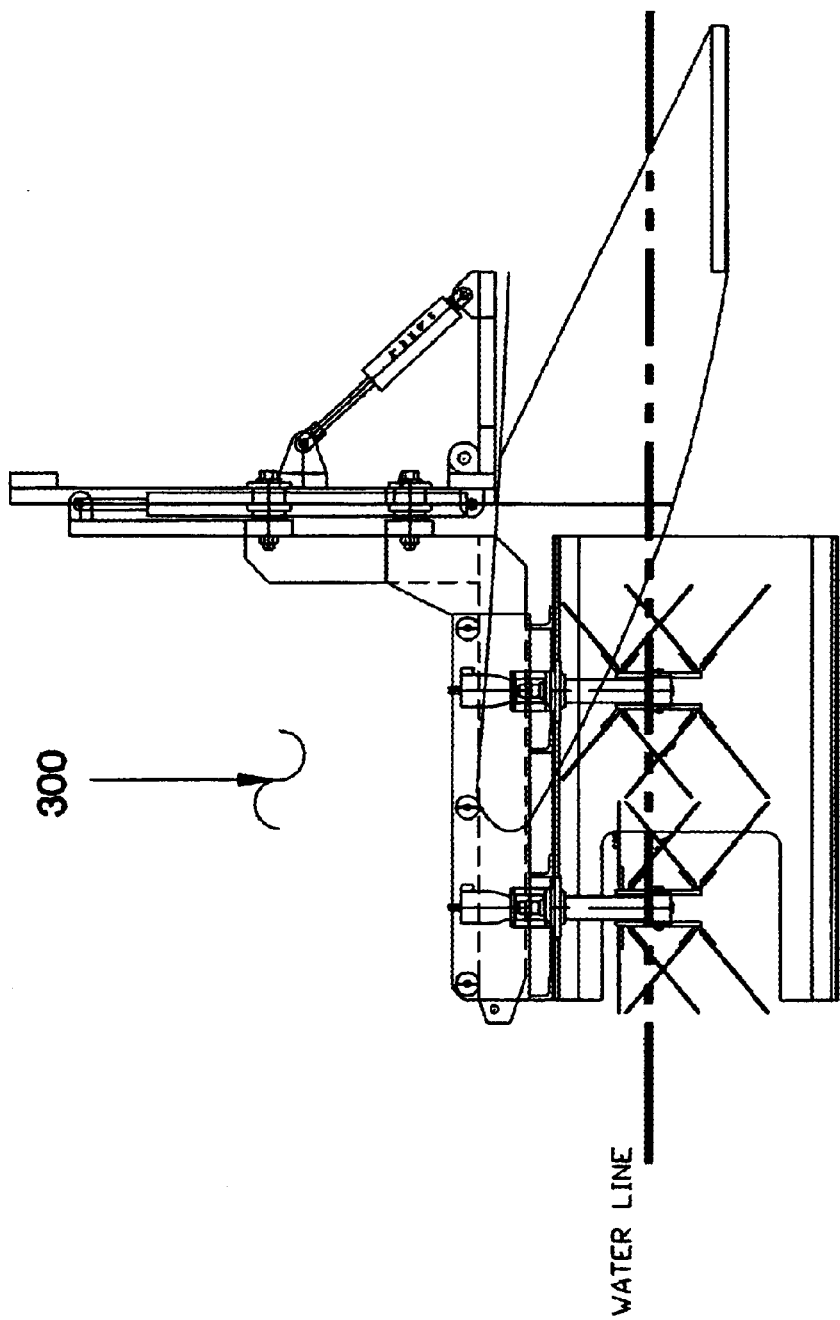

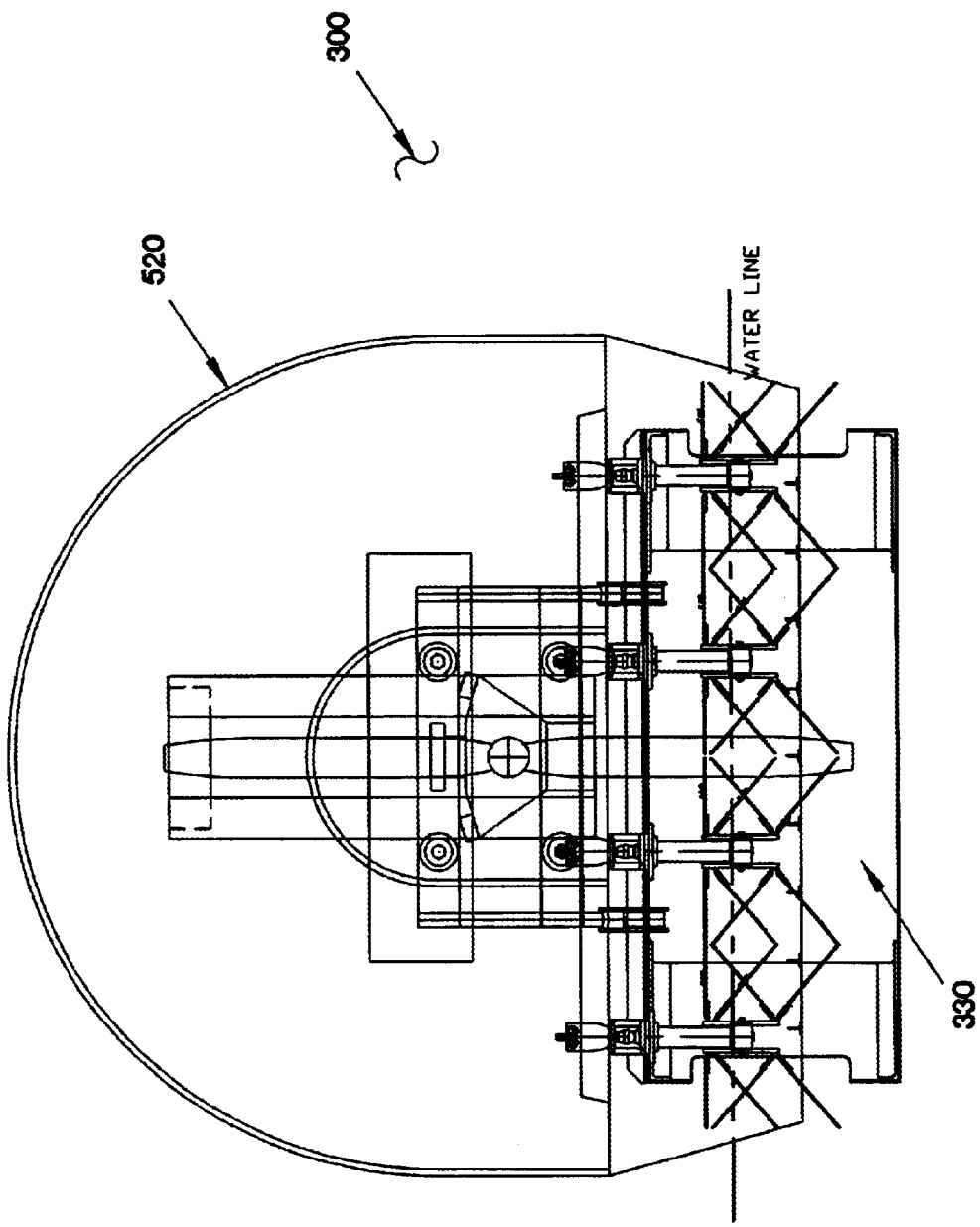

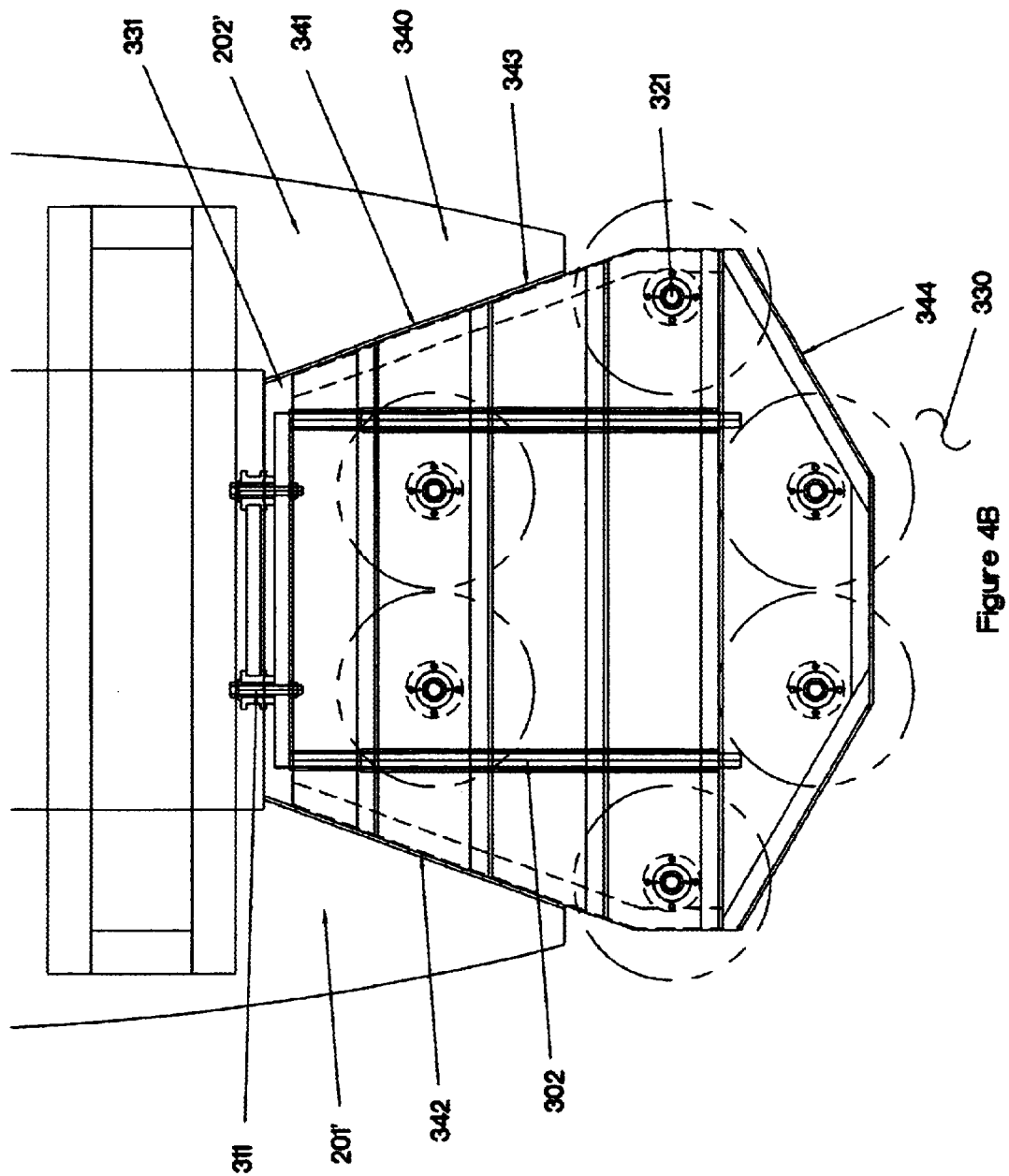

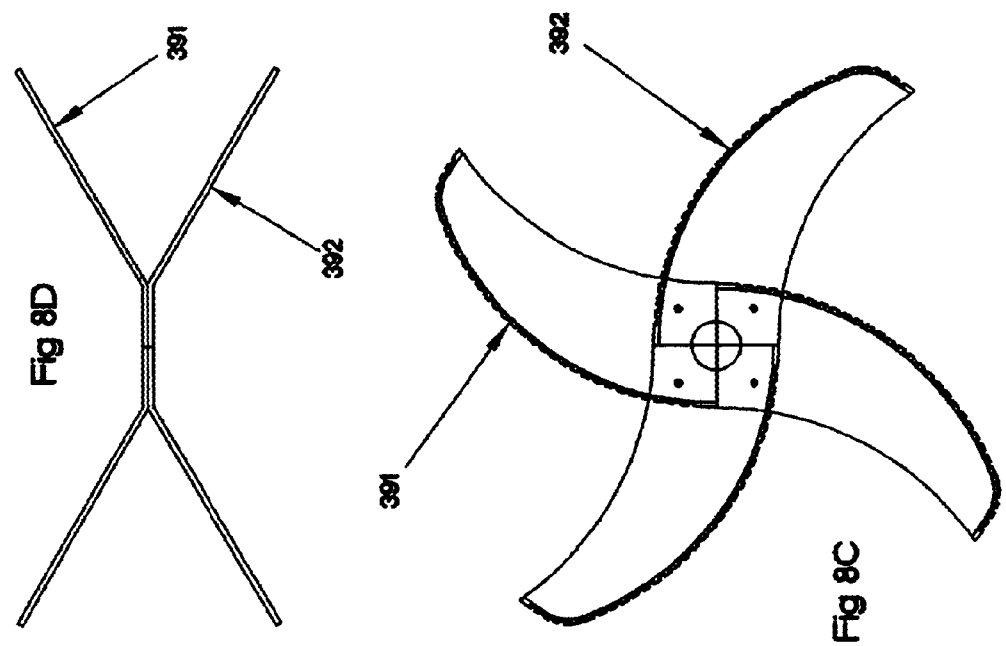
Fig 8D
Fig 8C
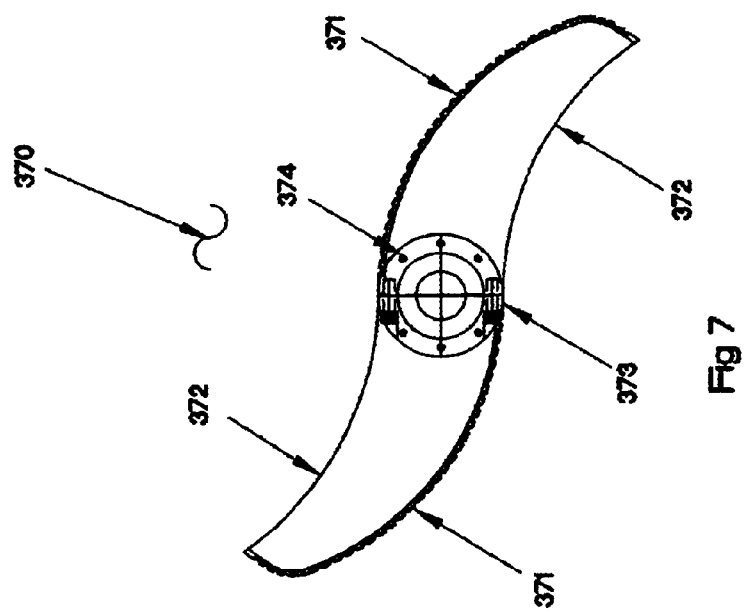
Fig 7

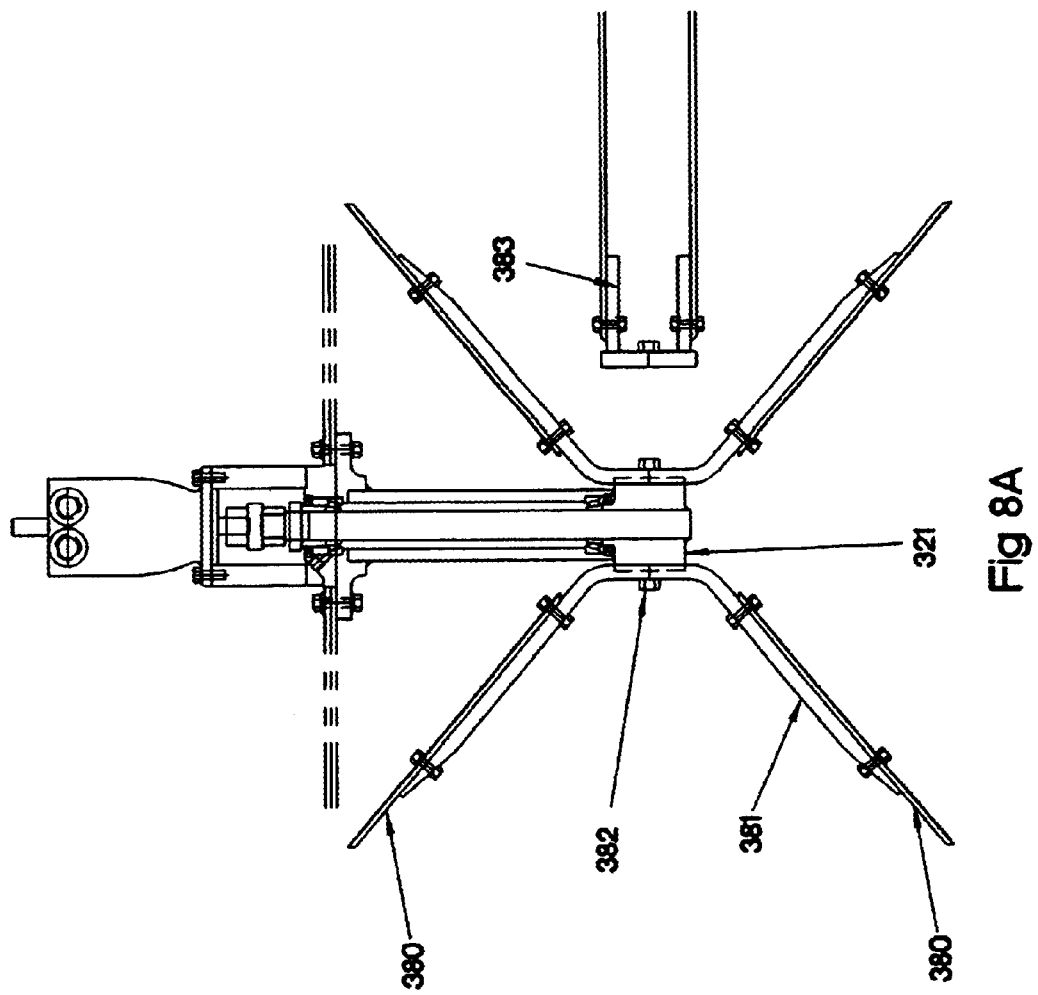

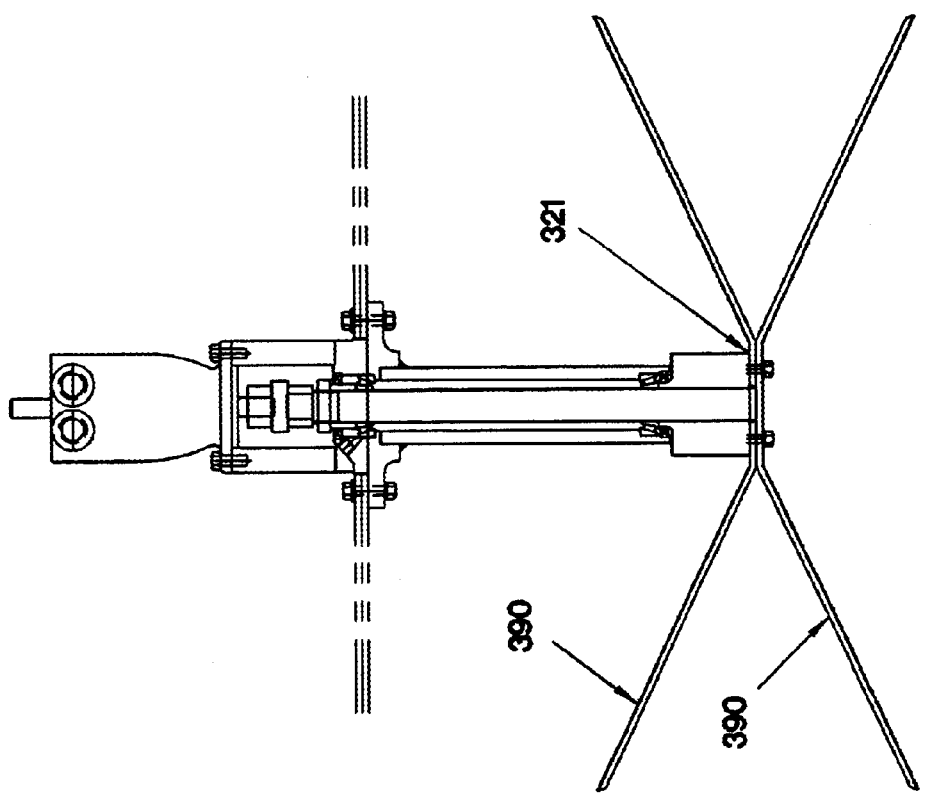

WATER CRAFT FOR REDUCING AQUATIC PLANT INFESTATION

BACKGROUND OF THE INVENTION

1. Field of the Invention

This invention relates to an improved water craft capable of efficiently reducing infestation in bodies of water by aquatic plants and the like.

2. Background Information

The present inventors have developed and patented a device disclosed and claimed in U.S. Pat. No. 5,542,240, ("the '240 patent"), which issued to patent on Aug. 6, 1996. The information and disclosure of that patent is hereby incorporated by reference, including the "Information Disclosure" and discussion of known patents and references found therein.

Essentially, the device disclosed according to the '240 patent represented an operative embodiment of a prototype device. The features of the improvement of the present invention reflect refinements that have been developed in the course of the arduous task of manufacturing of a commercial embodiment of the device disclosed according to the '240 patent. Thus, it is believed that the present invention represents a novel and non-obvious improvement to the device disclosed and claimed in the '240 patent.

In addition to the references cited in the '240 patent, since that date, the following additional references have come to the attention of the present inventors:

U.S. Pat. No. 5,481,856, which discloses a method and apparatus for cutting aquatic vegetation, including a cutter head of radially oriented rotatable cutting blades spirally mounted along a rotateable drum. Aquatic vegetation shredded by the device is diverted to a submersible pump for conveyance to a remote location.

U.S. Pat. No. 5,603,204, which relates to a device comprising two rotors arranged in a shallow V arrangement which directs shredded plant matter to an internal harvest location within the vessel.

It is believed that the present invention disclosure provides an improved water craft for reducing aquatic plant infestation, and that the improvements disclosed herein are new, useful and non-obvious in light of the references cited herein.

BRIEF SUMMARY OF THE INVENTION

This invention represents an improvement over the water craft for reducing aquatic plant infestation disclosed and claimed in U.S. Pat. No. 5,542,240. Accordingly, the improved device comprises:

(a) a hull having an intake port at the bow end of the craft whereby aquatic plant laden water enters the craft;

(b) an exhaust port whereby water and mulched aquatic plants are discharged; and (c) at least one array of cutting blades, rotatably disposed between said intake and said exhaust ports for mulching solid matter in the water passing from said intake port to said exhaust port;

wherein the improvement comprises at least one vertically-oriented cutter spindle and none, one or more of the following features:

(i) a positionable, interchangeable blade assembly disposed at said intake port and which may be raised, lowered, and tilted, and which in addition may be interchanged in the water, by means of a floatation feature, for an alternate blade assembly;

(ii) a cutter blade design, including a staggered, angular configuration of cutter blades, an intermeshed horizontal blade configuration, and a horizontal, swivel-mounted configuration;

(iii) an hydraulic system used to operate the cutter blades, including efficient aquatic plant infestation reduction through: cutter blade rotation between 500 and 4000 rpm via hydraulic motors, and placement of hydraulic oil reservoirs on either side of the water craft to facilitate cooling of said fluid;

(iv) centralization of electrical and hydraulic controls at the operator interface facilitating efficient handling of the water craft and cutter blade assembly; and (v) a funnel or "V" shaped cutter assembly housing.

These and other improvements will become apparent from a review of the full disclosure and claims appended hereto.

BRIEF DESCRIPTION OF THE DRAWINGS

FIG. 2A shows a side view of a first embodiment of the water craft of the present invention.

FIG. 3D shows a side view detail of the cutter blade assembly in the operation position.

FIG. 3E shows a frontal view of the cutter blade assembly in the operation position.

FIG. 4B shows a top view from a frontal aspect of one layout for the water craft cutter blades that comprises 6 spindles that are spaced apart.

FIG. 7 shows a top detailed view of one embodiment of an horizontally oriented cutter blade according to this invention.

FIG. 8A–D provide representations of alternative cutter blade shapes and attachment means.

DETAILED DESCRIPTION OF THE PREFERRED EMBODIMENTS

Figure 1:
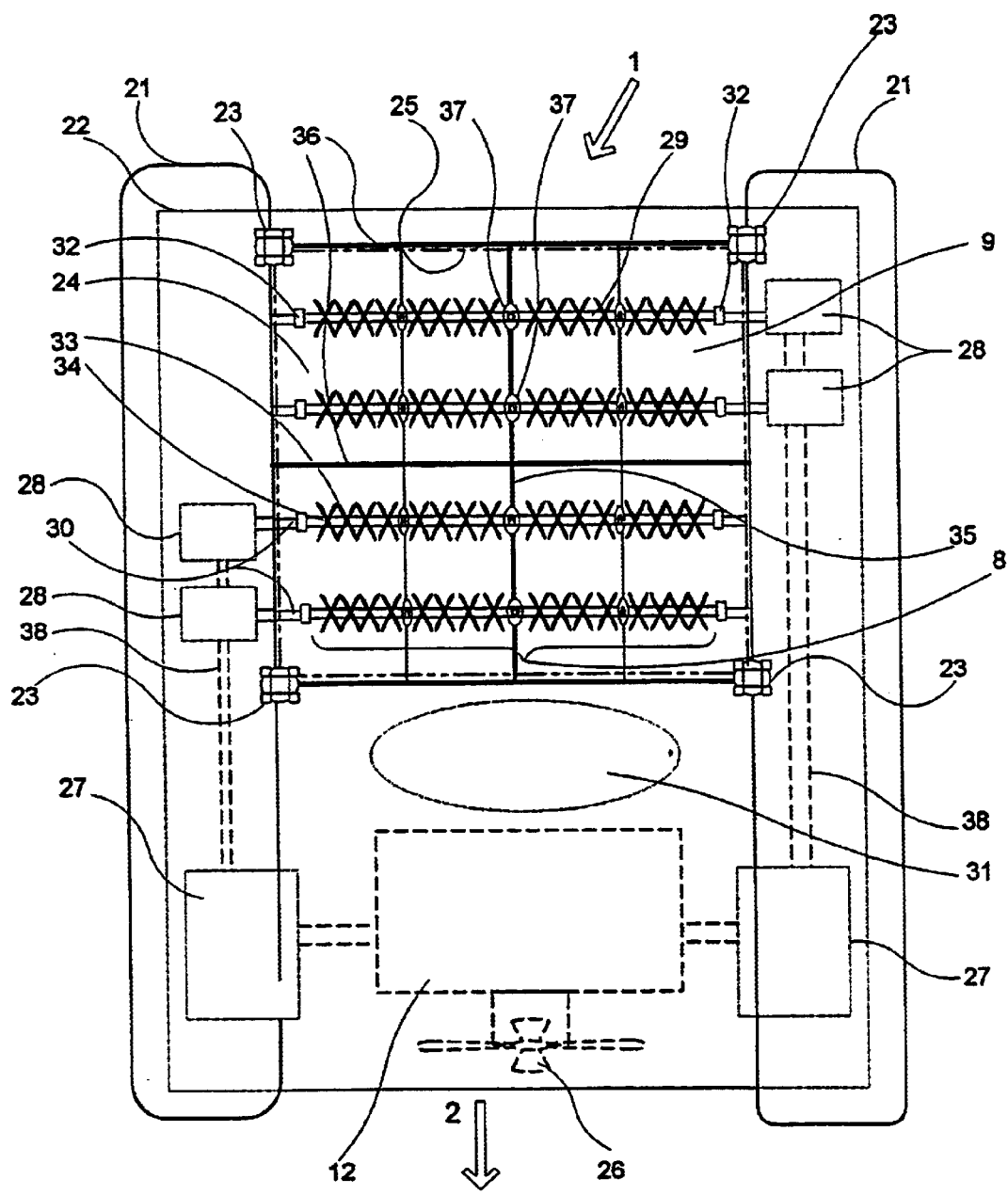
FIG. 1 shows a reproduction of FIG. 3 of U.S. Pat. No. 5,542,240, of which the present invention is an improvement.
Figure 3A:
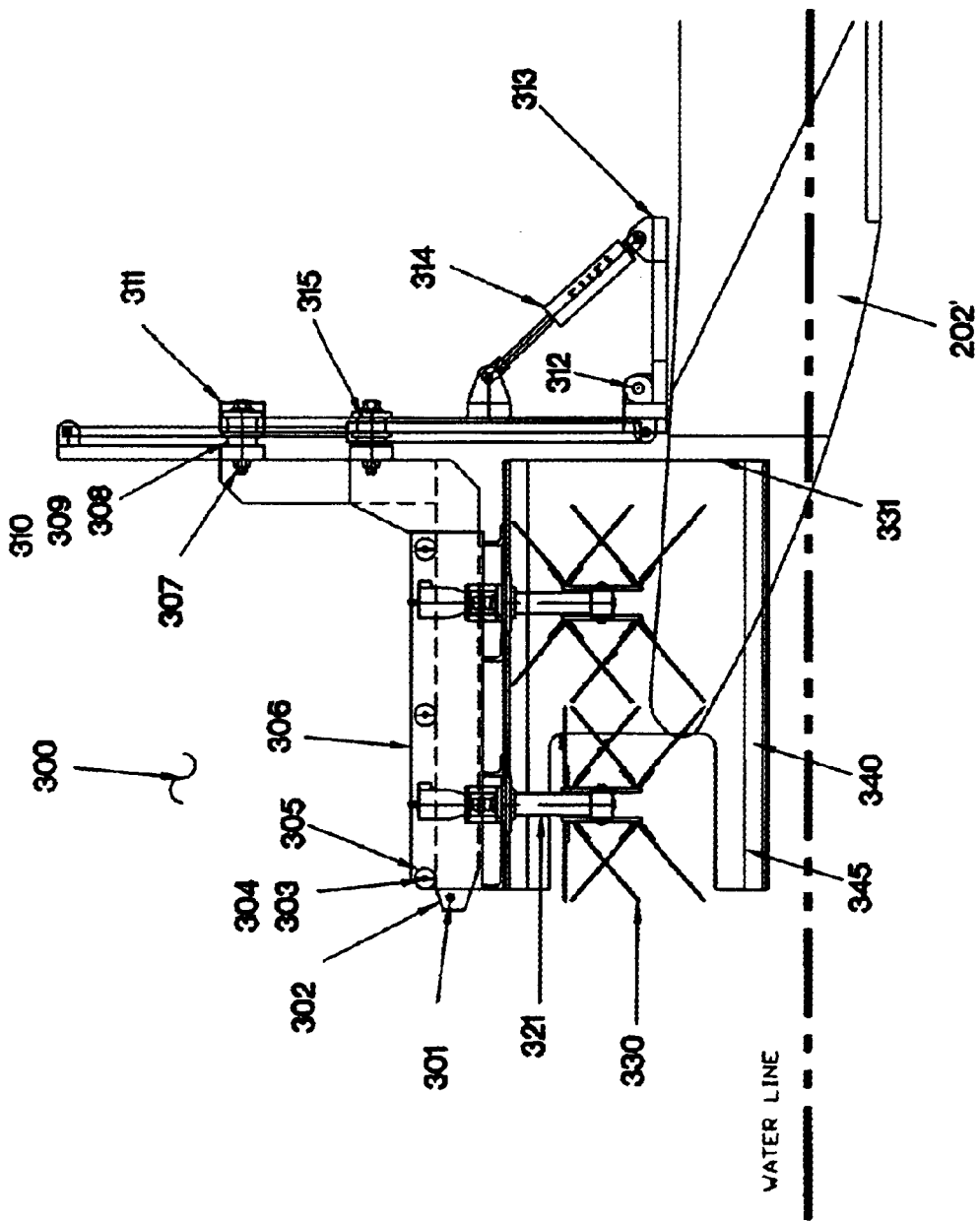
FIG. 3A shows a side view detail of the cutter blade assembly in a raised position.
Figure 3B:
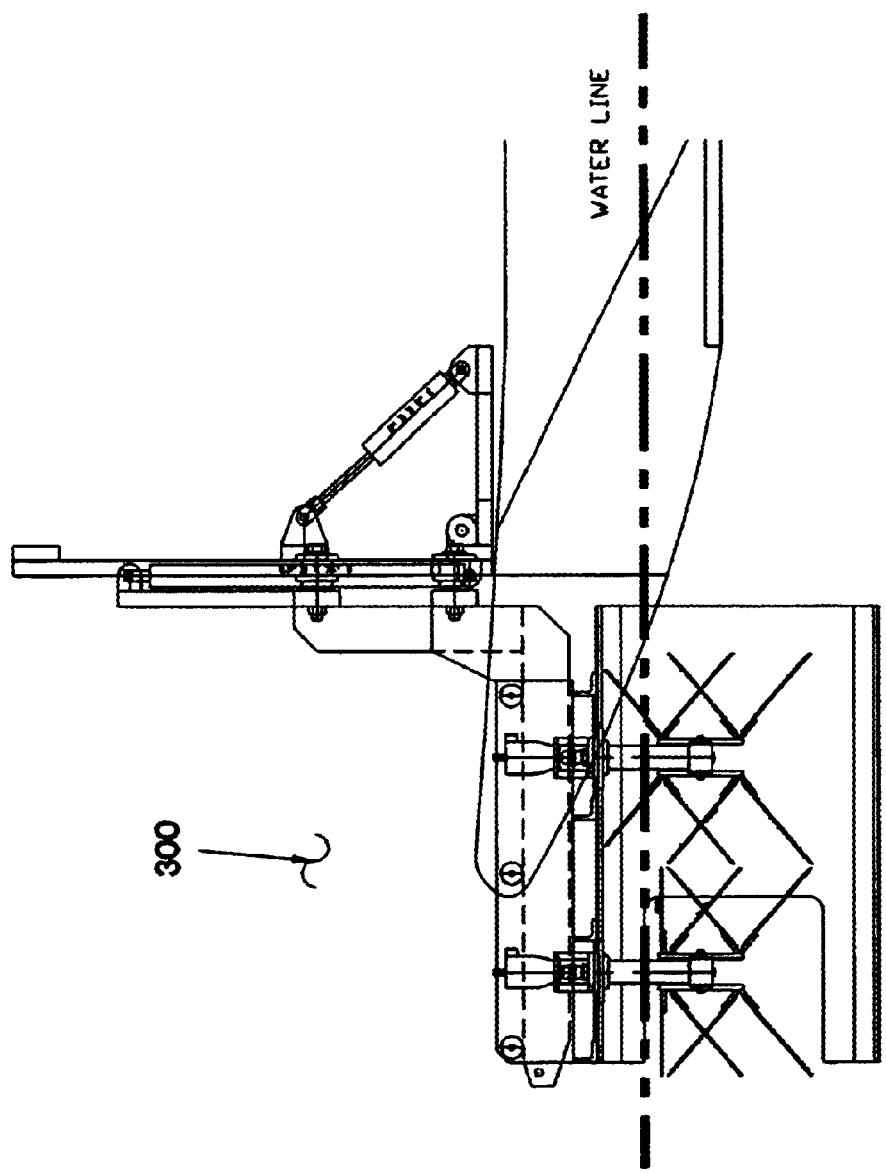
FIG. 3B shows a side view detail of the cutter blade assembly in a lowered position.
Figure 3C:
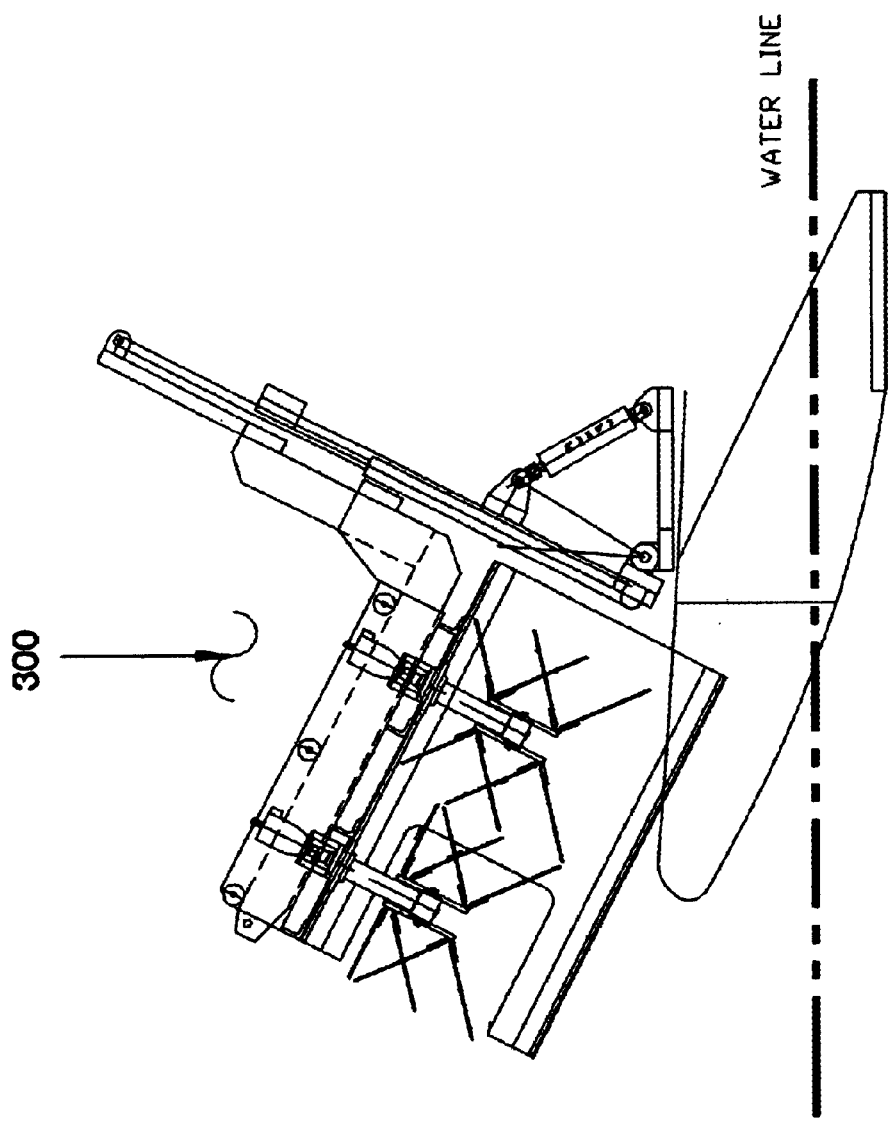
FIG. 3C shows a side view detail of the cutter blade assembly in a raised and tilted position.

Referring to FIG. 1, there is shown a reproduction of FIG. 3 of U.S. Pat. No. 5,542,240. The description or the reference numerals relating to that figure are hereby incorporated by reference, for purposes of defining the distinctions and improvements provided by the instant patent disclosure. As can be seen from that figure, reference numeral 1 ("ref. 1") refers to an intake port, ref.2 refers to an exhaust port, ref. 9 refers to a mulching chamber disposed between two pontoons, ref. 21. In the patented device, the mulching chamber ref. 9 is formed by an upper platform, ref. 22, supporting hydraulic supports, ref. 23, for raising and lowering the mulching chamber, ref. 9. Optionally, the mulching chamber, ref. 9, may have been fixed in place, with biomass coming into contact with cutter blades, ref. 33, mounted on a series of horizontally arrayed cutter shafts, ref. 29, coupled via coupling means, ref. 28, to hydraulic motors, ref. 28, which cause the shafts and blades to rotate.

Figure 2B:
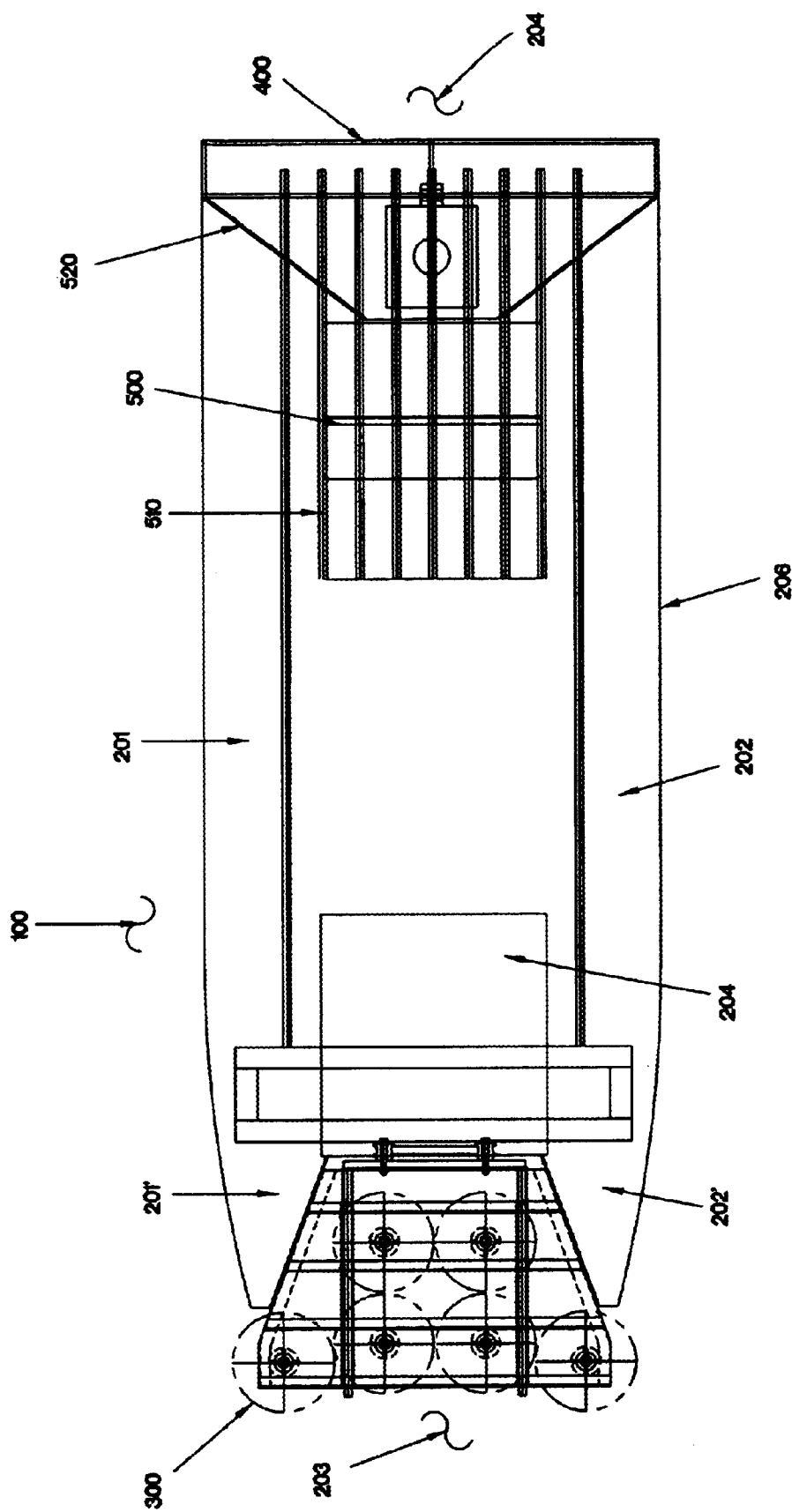
FIG. 2B shows a top view of a first embodiment of the water craft of the present invention.

Referring to FIG. 2A, there is provided a side view of a first embodiment of the device 100 of the present invention, while FIG. 2B provides a top view of the first embodiment of the device 100. The device 100 comprises: a hull 200, formed from two connected but spaced-apart pontoons 201 and 202, thereby forming an intake port 203 and an exhaust port 204 between the two pontoons 201 and 202, whereby aquatic plant laden water enters the craft, and after being mulched, is discharged from the craft, respectively. The pontoons 201 and 202 may, but need not, extend all the way to the rear of the craft. In one embodiment, the pontoons 201 and 202 are buoyant extensions 201' and 202' to a continuous (as opposed to spaced apart pontoons) hull 200. In this embodiment, and exhaust port 204' is formed by the space that exists between the forwardly projecting pontoons 201' and 202', which in this embodiment are, in essence, affixed to the front 205 of a water craft 100. The space between the pontoons 201' and 202' and the front surface 205 of the craft 100 defines an abutment against which mulched biomass is disgorged by the blade assembly 300, and discharged via exhaust port 204'. The bottom 206 of the front surface 205 of the craft 100 defines the bottom terminal side of the exhaust port 204'. The incoming aquatic plants according to this embodiment of the disclosure are mulched by a positionable, interchangeable blade assembly 300. In addition, the water craft shown in FIGS. 2A and 2B comprises a drive means 400, preferably comprising a motor 410 and an air-propeller 420, preferably enclosed in a protective cage 520, such that no submersible propeller, which would be susceptible to tangling in plant-infested water, is required. Furthermore, an operator control station 500 is mounted on a platform 510, which may extend part of the way or most of the way toward the front of the craft, or the platform 510 may be structured away from cage 520 anywhere between the front and rear of the craft. The operator control station comprises electrical and hydraulic controls of the water craft subsystems described herein, and may be enclosed within a cabin to reduce operator exposure to the elements, including noise and heat. Preferably, the cabin may be heated or cooled by an air conditioning unit.

As will be seen from the further detailed disclosure provided below of each of the aforementioned elements, the positionable, interchangeable blade assembly 300 may be positioned with respect to elevation and tilt, and may be interchanged with another blade assembly 300', same or different, without the need for removing the craft from the water, by means of a unique flotation feature. It will also become apparent from the following disclosure, that the blade assembly comprises cutter blades having a staggered, angular configuration, an intermeshed horizontal blade configuration, or a horizontal, swivel-mounted configuration, and variations thereof. Additional improved aspects of this embodiment of the invention include an improved hydraulic system used to operate the cutter blades by providing enhanced cutter blade rotational rate, improvements in the main hydraulic motor and placement of the hydraulic oil reservoir.

Referring to FIG. 3A, there is shown a side view detail of the cutter blade assembly 300 in a raised position. This view shows a number of features relevant to operation of the device, including a front portion of the pontoon 202' on the left side of the craft. The remaining features shown in this view contribute to an assembly that is positionable and interchangeable.

A lynch pin 301 provides for the stability of the mulching chamber or blade assembly 300 by keeping the chamber from shifting during the lifting and tilting operation. The pin 301 is desirably affixed in such a fashion as to make it secure but easily removable, so as to allow the chamber 300 to be interchanged, in situ, (i.e. with the water craft in the water). Once a new chamber 300' is inserted, the pin 301 is replaced. Interchangement of the cutter blade assembly 300 is facilitated by the housing 340 thereof comprising a chamber 345 which is hollow and sealed against penetration by water. The chamber 345 provides buoyancy to the assembly 300, thereby facilitating interchangement of the assembly 300 with a replacement assembly 300', upon release of the lynch pin 301. It will be appreciated that sides and top portions of the housing 340 may also or alternatively be hollow and sealed to provide buoyancy.

A prong assembly 302 provides support means, such as protruding arms, to enable lift and tilt of the blade assembly 300. Spacers 303 provide support to the heads of bolts 304, which optionally provide a means for attaching rollers 305. The rollers 305 allow the chamber 300 to be slid into and out of engagement in the craft, while minimizing wear on the prong assembly 302. The rollers 305, in addition, facilitate removal of the chamber 300 in situ, while the chamber 300 floats due to the buoyancy of chamber 345. Furthermore, the rollers 305 permit the prong assembly 302 to rise and fall when the lift and tilt mechanism is activated by means of the hydraulic cylinder 314. A sideplate 306 comprises a sheath attached to the mulching chamber 300 in which the prong assembly 302 is housed and retained by the lynch pin 301. Bolt 307 affixes prong assembly 302 to tilt frame 311 via a spacer 308, a washer 309 and a roller 310. The tilt frame 311 provides for assemblage of the remaining elements of the cutter blade assembly 300, which rotates about a pivot pin 312. A base frame 313 is connected to the tilt frame 311, thereby providing a base element. Hydraulic cylinder 314 permits the tilt frame 311 to be tilted up or down by expanding or contracting relative to the tilt frame 311 and the base frame 313, to which the hydraulic cylinder 314 is attached. Hydraulic cylinder 315 provides a means for raising and lowering the cutter assembly 300. Housing 340 may have any number of shapes. However, in order to minimize the number of cutter spindles 321 required while maximizing the cutter surface area, we have found that a substantially funnel-shaped housing 340 is a preferred shape. As can be seen in the side view provided in FIG. 3A, and the detailed side view of FIG. 5, in one embodiment of this invention, the housing 340 may have essentially a "backward C shaped" profile, with both the forward end 330 and rear end 331 being open to allow water and biomass to enter and exit the housing, respectively. In one embodiment, viewed from the top in FIG. 4A, the housing 340 is "funnel-shaped", having a wider entryway 330 than exitway 331. Thin this embodiment, it can be seen that the housing has a left side wall 342, a right side wall 341, a top wall 344 and a bottom wall or panel 343. In the embodiment shown in FIG. 4A, viewed from the top, the left sidewall 342 and right sidewall 341 slant inward from the front entryway 330 toward the rear exitway 331, thereby forming a truncated "V" or funnel-shape. The upper wall 344 extends beyond the lower wall or panel 343. In this manner, chopper blades mounted on rotating, vertically oriented forward spindles 321, which are affixed to the upper wall 344, extend beyond the confines of the housing 340 (see further description of the mulching hardware and vertically-mounted spindles below).

Figure 4A:
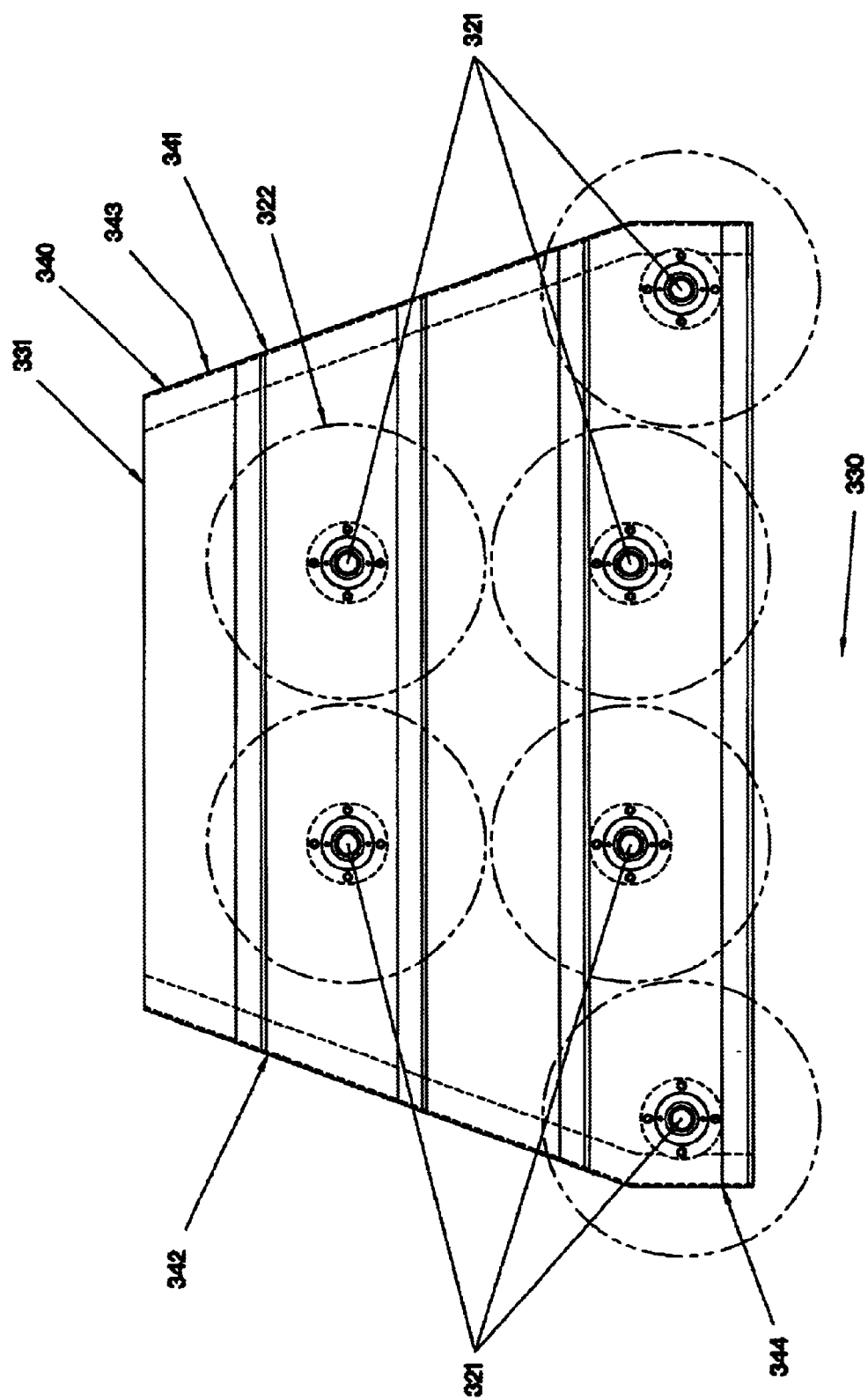
FIG. 4A shows a top view from a frontal aspect of one layout for the water craft cutter blades that comprises 6 spindles, four proximal and two distal with respect to the front of the water craft.
Figure 4C:
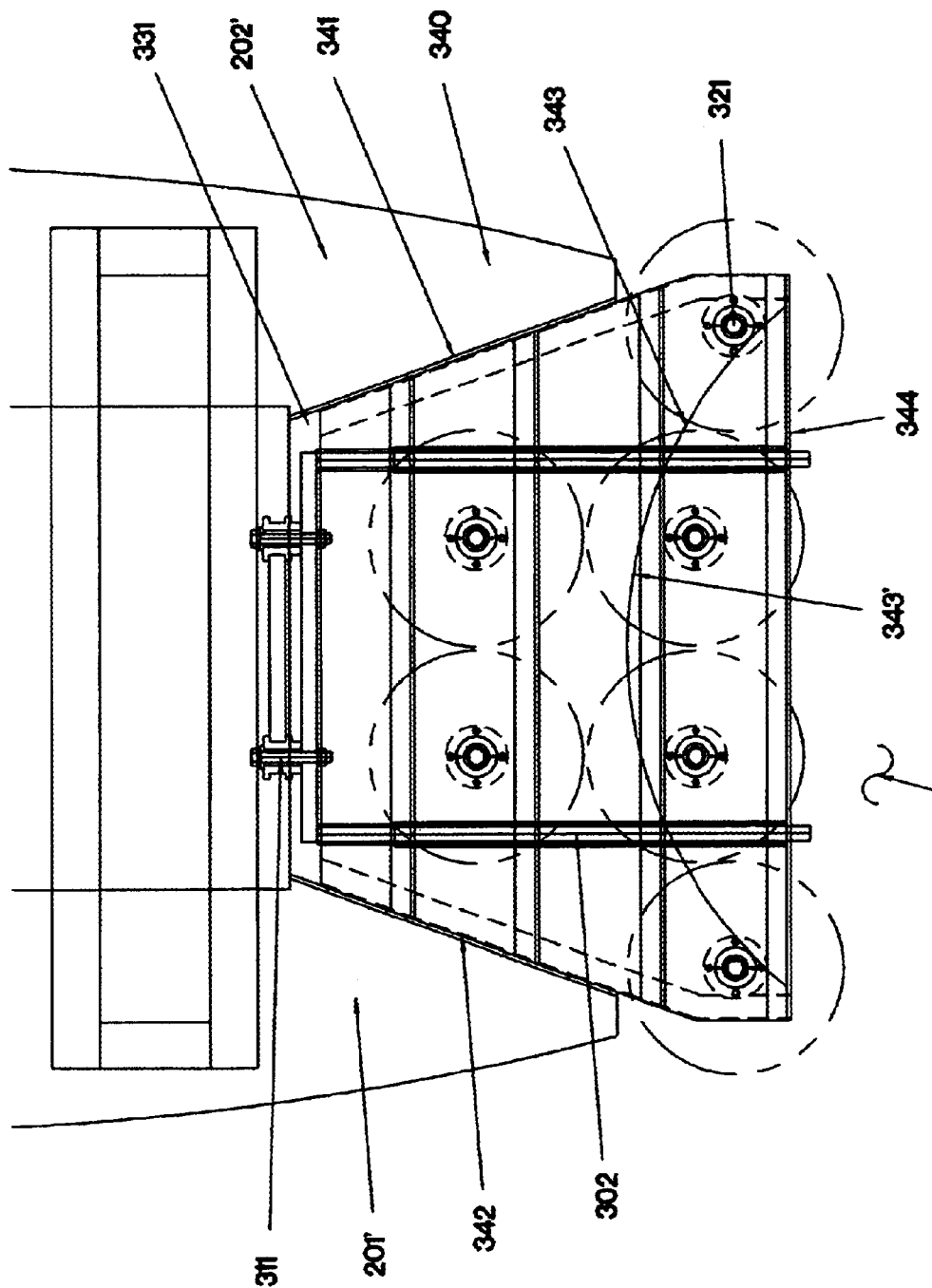
FIG. 4C shows a top view from a frontal aspect of one layout for the water craft cutter blades that comprises 6 spindles, two proximal and four distal with respect to the front of the water craft.

In the embodiment shown in FIG. 4B, the upper wall 344 extends forward, permitting a different arrangement of spindles 321 than that shown in FIG. 4A. In this embodiment, the lower wall 343 terminates well aft of the upper wall 344 extension. In yet a further embodiment shown in FIG. 4C, it can be seen that the upper wall 344 is permitted to extend beyond the front edge of the lower wall 343, by means of the lower wall 343 having a concave forward edge 343'. In this fashion, front spindles 321 extend beyond the confines of housing 340, thereby making access to aquatic plant infestation more immediate.

Figure 5:
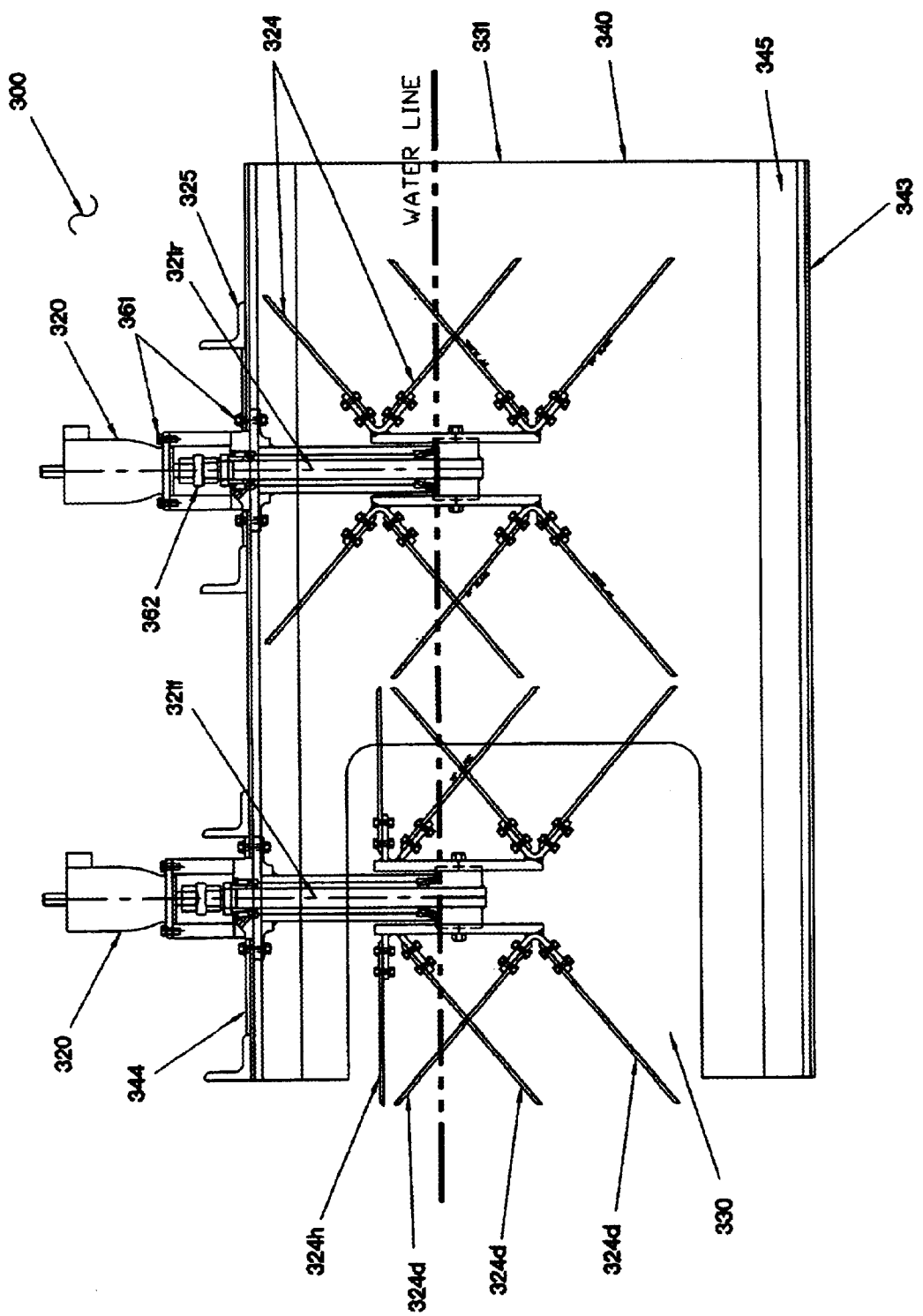
FIG. 5 shows a detailed side view of the cutter spindles and cutter blades of one embodiment of the invention.

Referring to FIG. 5, it can be seen that the mulching hardware is represented by a novel arrangement of cutter motors 320, which cause vertically-mounted cutter spindles 321 to rotate, upon application of hydraulic or other torque power to the cutter motors 320. Those skilled in the art will recognize that motors other than hydraulic motors may be used without departing from the scope of the invention disclosed and claimed herein, but we have found that for efficiency purposes, hydraulic motors are preferred. The spindles are preferably made to rotate at about 500–4000, and preferably at about 3600 revolutions per minute, to achieve torque forces of about 66–100 foot-pounds. As will be appreciated, any number of spindles may be provided, within reason, given the constraints of space, power, weight and expense in construction of the craft. In various embodiments, it may be desirable to employ anywhere from one to ten spindles per cutter assembly 300. In one embodiment, an arrangement of about six spindles 321 is configured, for example, as shown in FIG. 4, as a top view oriented with the four adjacent spindles being at the front-most aspect of the cutter assembly 300, such that plant matter first encounters that set of cutter blades whose sweep 322 is outlined. In FIG. 5, there is shown a side view detail of the cutter assembly 300, a cutter motor 320, a rear cutter spindle 321r and a forward cutter spindle 321f. As can be seen, cutter blades 324 are affixed to the cutter spindles 321r and 321f by means of blade holders 325 to which the blades 324 may be bolted or welded. Bolting of the blades is preferred to facilitate replacement of dulled or damaged blades. As can be seen, any arrangement of blades that achieves efficient mulching of aquatic plant infestation is acceptable. However, we have found it advantageous to have the blades on the anterior spindle 321f arranged as a combination of horizontal blades 324h and diagonally arranged blades 324d. The blades on the rear spindle 321r may all be arranged diagonally, and preferably include blades that extend above the water line during normal water craft operation, or which cut very close to the bottom surface of upper wall 344 of housing 340. The angle of inclination of the diagonally oriented blades 324d is preferably between about 40 and 60 degrees from the vertical defined by the spindle 321, and most preferably is about 50 degrees. For the diagonally oriented blades, and in fact for all of the blades, it is preferred that a hardened metal, such as through heat-treatment, is used to prevent buckling or easy damage.

Figure 6:
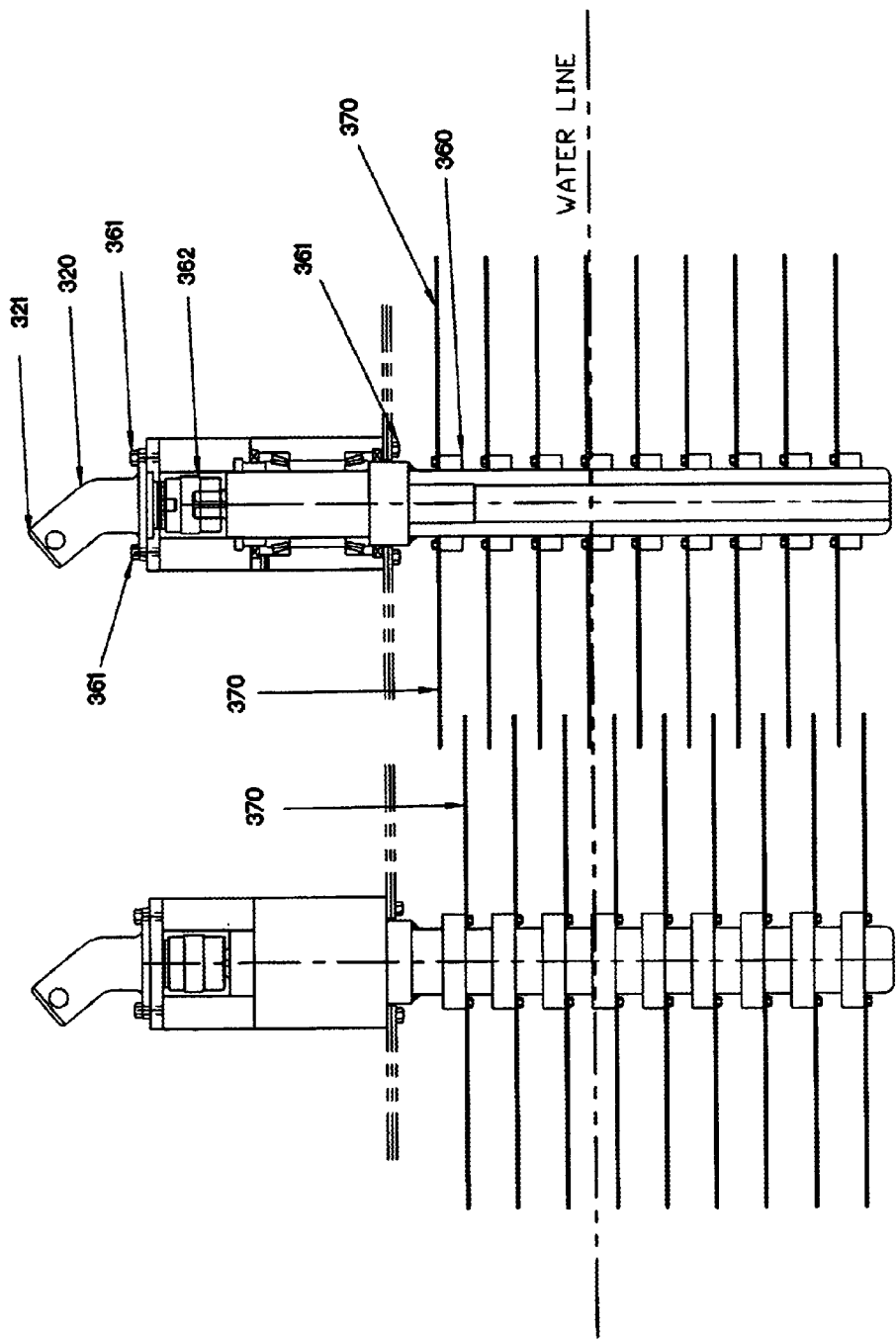
FIG. 6 shows a detailed side view of the cutter spindles and cutter blades of a second embodiment of the invention.

In an alternate embodiment, the spindles 321', shown in FIG. 6 as a side view of the vertically oriented spindles, provide a series of clamps 360 onto which are bolted intermeshed horizontal blades 370. Also shown in FIG. 6 is an hydraulic motor 320', motor mounting screws 361, motor coupling 362'. One embodiment of a blade that may be used according to this aspect of the invention is shown in FIG. 7. As can be seen, each such blade has two leading surfaces 371 machined to form a sharp cutting surface, preferably such as the serrated surface shown in this figure, which permits "gripping" and slicing of biomass brought into contact therewith. Each blade, in addition, has a pair of trailing surfaces 372, which need not be adapted (but which could be so adapted) for cutting biomass. A pair of set screws 373 may be employed to affix the two halves of the blades to the spindles 321' and screws 374 are provided for bolting the assembled blades to the clamps 360. Naturally, those skilled in the art will be able to envision other cutter blade and assembly means based on what is disclosed and suggested here. Such variations come within the scope of this invention.

Thus, for example, as shown in FIG. 8, blades 380 may be bolted or welded to "C-shaped" mounts 381 which are bolted 382 directly to the bottom of the spindle 321. In addition, an ancillary, horizontally-oriented, cutter blade assembly 383 may be bolted to the base of the spindle 321, between the prongs of the "C-shaped" mount 381, to provide added cutting power. In a further embodiment, shown in FIG. 8B, angled blades 390 may be bolted directly to the bottom of the spindle 321. As shown in FIG. 8C, blades 390 may be clamped to each other, and as viewed from the top, each blade has features similar to blade 370 shown in detail in FIG. 7. However, blades 390 comprise a right-handed blade 391 and a left-handed blade 392. Viewed from the side, as in FIG. 8D, it can be seen that the right-handed blade 391 is mounted above the left-handed blade 392, and that blade 391 has diagonally upwardly oriented terminal blade portions, while blade 392 has diagonally downwardly oriented terminal blade portions, with the angle of orientation being about 30 degrees from the horizontal. Thus oriented, the blades should be mounted on the right front side of the craft, viewed looking from the operator station toward the front of the craft, for counter-clockwise rotation. In this way, plant biomass is drawn into the blade assembly 300. For clockwise rotation of blades mounted on the left front side of the craft, blade 392 is affixed above blade 391.

In yet a further embodiment of the cutter blade assembly, a substantially circular plate is mounted to the base of a cutter spindle 321, and attached to the circumference thereof is a plurality of cutter blades, each of which is affixed by a rivet or bolt means, which permits the blade to swivel. In this fashion, the blades are forced into outward extension upon application of torque, and upon striking an unyielding surface, the blades are permitted to bounce off said surface. This embodiment is particularly preferred for applications wherein cutting of thick, sturdy or rock-infested biomass is required.

Figure 9:
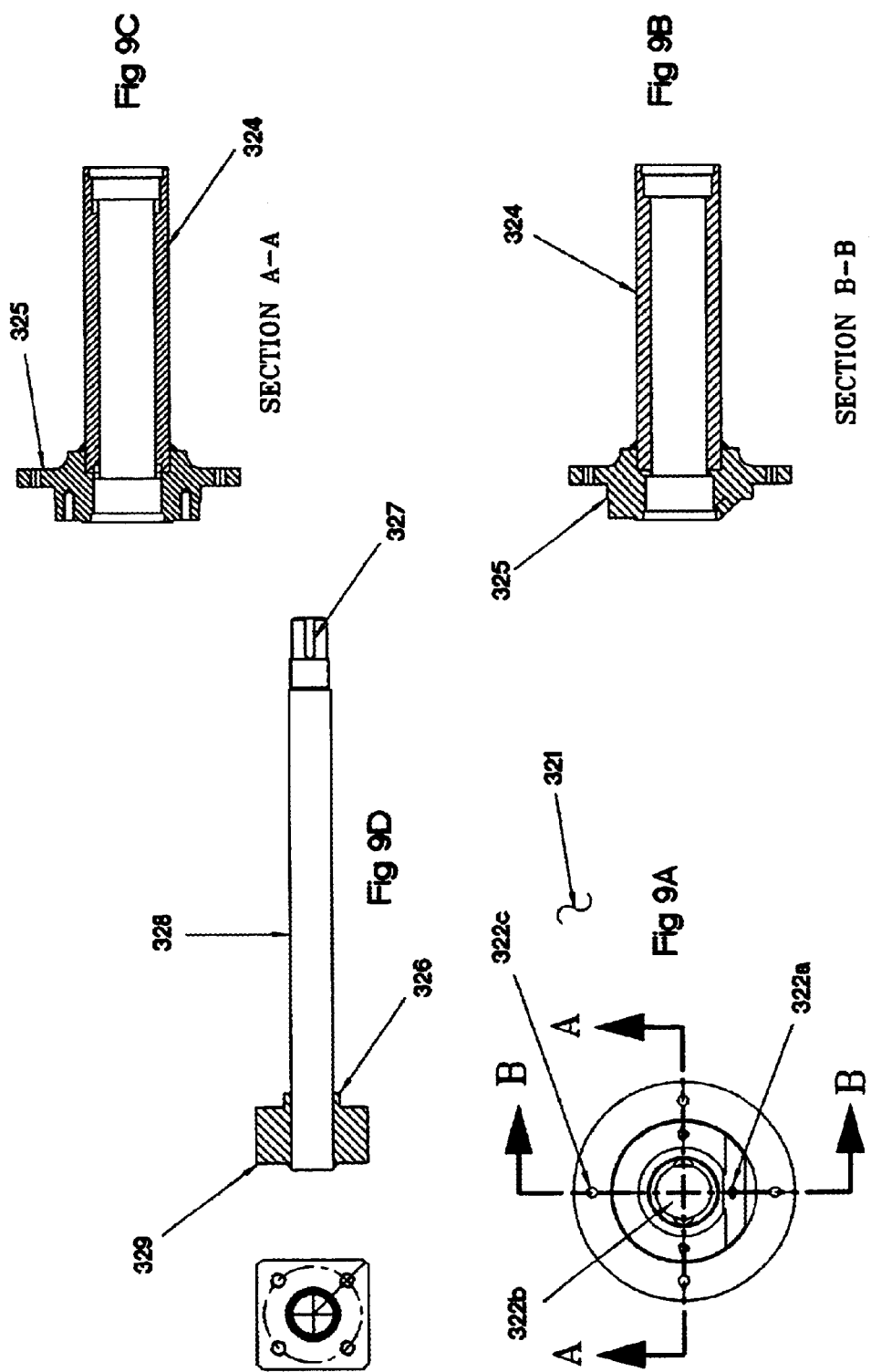
FIG. 9A–D provides a depiction of the vertically oriented cutter spindle of this invention.

Referring now to FIG. 9, there is shown a detail of the vertically oriented spindles 321. In FIG. 9A, spindle 321 is viewed from the top, showing sections A—A and B—B. As can be seen in FIG. 9A, each spindle 321 comprises a housing 322 comprising an outer tube 324 fitted into a flange 325 and welded thereto. The housing 322 comprises a top hole 322a for oil-filling, and a central bore 322b, into which a spindle shaft is sealingly inserted and housed. Accordingly, the oil-filled housing provides an oil bearing within which the spindle shaft is free to rotate. Holes 322c provide a means for bolting the housing to cutter assembly housing upper wall 344. In FIG. 9D, the spindle shaft 326 is shown, comprising a coupling 327 for linkage to any hydraulic motor, a shaft 328 which sealingly fits within spindle shaft housing central bore 322b, and a base 329 to which cutter blades are bolted or welded.

In addition to variations in the cutter blade and spindle designs discussed above, those skilled in the art will appreciate that ancillary cutter means, including but not limited to use of compressed air, high-pressure water jets, and the like, may also be contemplated for use in conjunction with the cutter means described herein. In addition, those skilled in the art will appreciate that the cutter assembly 300 may be supplemented by mounting similar cutter assemblies on either or both sides of the water craft, to provide an expanded cutting width for the craft (i.e. to achieve remediation of a greater number of acres per hour of water craft operation). The side-mounted cutter assemblies are mounted at the approximate mid-point of the craft, may be lifted, tilted and exchanged out, as described for the forward cutter assembly 300 described above, and preferably operate by means of hydraulics, as described above.

It will also be appreciated that housing 340 may have no bottom wall 343 or that said bottom wall 343 may be significantly shorter than upper wall 344. In addition, it will be appreciated that where deep cutting of submersed biomass is required, vertical spindle shafts 321 may be configured to extend well below the bottom of the water craft, such that cutting of deeply infested water and submerged cutting is thereby enabled. Raising and lowering of the cutter assembly 300 may be supplemented for such applications by means for raising and lowering a long spindle shaft 321.

Having described the cutter assembly 300 in considerable detail, it is noted that the means for providing the torque for the cutter assembly spindles 321 is preferably an engine which drives an hydraulic pump, which pumps hydraulic fluids, such as oil, through hydraulic lines, to the various hydraulically activated mechanisms: the hydraulic spindle motors, and the hydraulic lift and tilt mechanism for the cutter assembly. For this purpose, an oil-reservoir is preferably provided in a central location in the boat, or more preferably, is provided as a pair of hydraulic reservoirs disposed along the side and base of the craft, thereby permitting heat dissipation of the hydraulic oil through heat transfer to the water through which the craft is propelled. To supplement such cooling, preferably included in the hydraulic circuit is an air cooled radiator, or the like, through which the hydraulic fluid is pumped. In one embodiment of this invention, where the principal means for propulsion of the water craft is an air-propeller (i.e. where the water craft is a modified air-boat), the significant draught created by the air-propeller is put to use by abutting the hydraulic radiator to a cage 520 enclosing the air-propeller. In this way, as the propeller drives the craft forward, air that is drawn rearward by the propeller is forced to travel through the radiator. Where an in-water propeller is used, it may be necessary to provide supplemental air cooling, by means of a fan or the like.

As noted above, the water craft according to this invention comprises a drive means 400, preferably comprising a motor 410 and an air-propeller 420, such that no submersible propeller is required. The motor 410 is preferably a diesel engine. The engine is preferably cooled by a water-cooled or coolant-filled radiative means. In a particularly preferred embodiment of this invention, a single diesel engine is used to drive both the air-propeller and the remainder of the water-craft hydraulic systems. Particularly preferred is an arrangement wherein the air-propeller is likewise powered as a component of the hydraulic system employed for providing torque to the cutter spindles. Alternatively, a separate engine may be used for driving the hydraulics and the air-propeller, in which case each engine is preferably cooled by use of standard radiative means. In yet a further embodiment of this invention, either connected to the existing hydraulic systems or as a separate assembly, a motor and propeller means are provided to enable the water craft to reverse its direction. Optionally, this is achieved by providing an out-board motor at the rear or on either or both sides of the water craft, or by providing a means for reversing the direction in which the air-propeller drives the craft.

Figure 10:
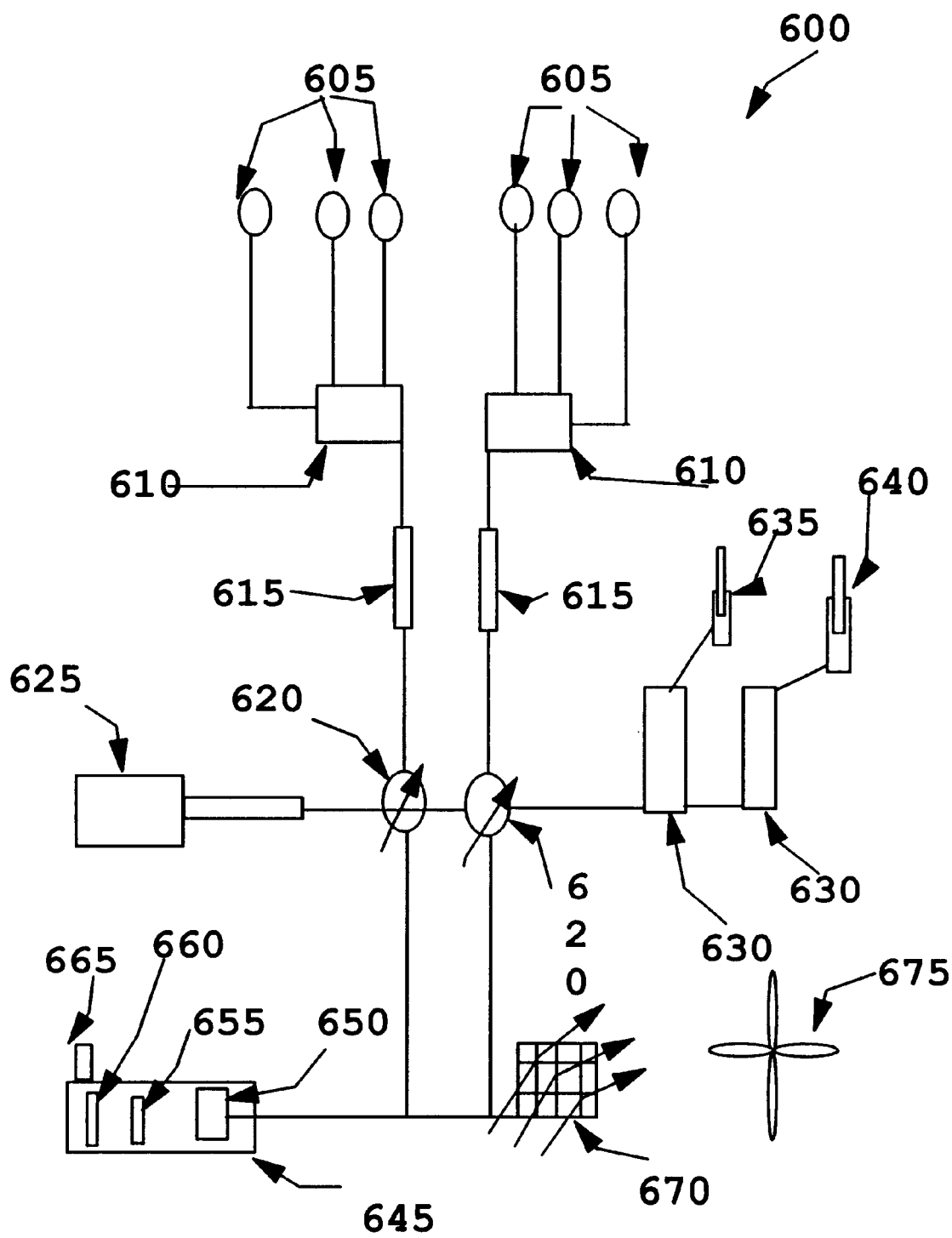
FIG. 10 provides a schematic representation of one hydraulic circuit useable according to the present invention.

Referring to FIG. 10, there is shown a schematic of one embodiment of an hydraulic circuit 600 useable in a craft as disclosed and claimed herein. For purposes of simplicity, the depicted circuit does not show outgoing and return lines. Those skilled in the art will appreciate that hydraulic systems operate through a circuit of pressure applied to hydraulic fluid, typically oil. The circuit shown in FIG. 10 comprises a representation of hydraulic motors 605 which are linked to chopper spindles 321. These motors receive hydraulic torque power via proportioning, multiplexing and load sensing means 610. Included in the circuit are hydraulic filters 615 which remove any debris that might enter the hydraulic system. Hydraulic pumps 620 pump the hydraulic fluid through said filters 615 and said proportioning, multiplexing and load-sensing means 610 to motivate said hydraulic motors 605. The hydraulic pumps 620 are caused to operate through linkage to a diesel motor 625 or like power generating means. Also included in the circuit are proportioning, multiplexing and load sensing means 630 which control, via electrical linkage to the operator control station 500, hydraulic tilt cylinder 635 and hydraulic lift cylinder 640 (314 and 315 respectively in FIG. 3A). Hydraulic pumps 620 draw hydraulic fluid from a reservoir 645, comprising an in-reservoir filter 650, a level gauge 655, a thermostat 660 and a breather 665. On the return circuit, hydraulic fluid is cooled via transmission through a radiative means 670. In the example shown in FIG. 10, radiator 670 is placed adjacent to air-propeller 675 which is drawing air through said radiator 670, thereby cooling hydraulic fluid as it traverses through said radiator 670 on the way back to said reservoir 645.

Each of the above-described subsystems, including the cutter assembly 300, the hydraulics and the control of forward and reverse drive means, are controlled by an operator at an operator control station 500. The operator control station 500, optionally enclosed within a cabin, preferably provided with air conditioning. The cabin is preferably mounted on a platform 510 which provides a clear vantage point for navigation of the craft and for control of each of the water-craft subsystems. Central localization of the electrical and hydraulic controls enhances efficient handling of the water craft and cutter blade assembly 300, both at the operator interface and at the hardware operational interface.

Having described the improved water craft of this invention in detail, it will be appreciated that the scope of the claims appended hereto define the novel and inventive aspects of the invention, including modifications, variations and equivalents thereof, disclosed, enabled and suggested by the instant disclosure.

What is claimed is:

1. An improved water craft for reducing aquatic plant infestation, said water craft comprising:
   (a) a hull having an intake port at the bow end of the craft whereby aquatic plant laden water enters the craft;

(b) an exhaust port whereby water and mulched aquatic plants are discharged; and (c) at least one array of cutting blades, rotatably disposed between said intake and said exhaust ports for mulching solid matter in the water passing from said intake port to said exhaust port;

wherein the improvement comprises at least two vertically-oriented cutter spindles and a positionable, interchangeable blade assembly disposed at said intake port, said assembly is enabled to be raised, lowered and tilted, and is configured to be interchanged in the water for an alternate blade assembly; and a cutter blade design comprising a staggered, angular configuration of cutter blades, an intermeshed horizontal blade configuration, a horizontal, swivel-mounted configuration, or combinations thereof.

2. The improved water craft according to claim 1, further comprising a hydraulic system that comprises hydraulic fluid used to operate the cutter blades, including efficient aquatic plant infestation reduction though cutter blade rotation between 500 and 4000 rpm via hydraulic motors, and placement of hydraulic oil reservoirs on either side of the water craft to facilitate cooling of said hydraulic fluid.

3. The improved water craft according to claim 1, further comprising centralized electrical and hydraulic controls facilitating efficient handling of the water craft and positionable, interchangeable blade assembly.

4. The improved water craft of claim 1, further comprising a funnel or "V" shaped cutter assembly housing.

5. The water craft according to claim 1 further comprising a drive means for propelling said water craft, comprising a motor and an air-propeller, such that no submersible propeller, which would be susceptible to tangling in plant-infested water, is required.

6. The water craft according to claim 5 further comprising an operator control station mounted on a platform, for providing electrical hydraulic control of the water craft.

7. The water craft according to claim 1 wherein said positionable, interchangeable blade assembly is positionable with respect to elevation and tilt, and is interchangeable with another blade assembly, same or different, without the need for removing the craft from the water, by means of a flotation feature.

8. The water craft according to claim 1 wherein said positionable, interchangeable blade assembly is retained and released from engagement with the water craft by means of a lynch pin.

9. The water craft according to claim 1 wherein interchangement of said positionable, interchangeable blade assembly is facilitated by a housing thereof comprising a chamber which is hollow.

10. The water craft according to claim 9 wherein a prong assembly provides support means to enable lift and tilt of the positionable, interchangeable blade assembly.

11. The water craft according to claim 10 further comprising at least two spacers, which provide support to at least two bolts, which provide a means for attaching rollers; wherein said rollers allow the blade assembly to be slid into and out of engagement in the craft, while minimizing wear on the prong assembly, facilitate removal of the positionable, interchangeable blade assembly in situ, while the blade assembly floats by means of a flotation feature of the blade assembly, and which permit said prong assembly to rise and fall when a hydraulic cylinder is activated.

12. The water craft according to claim 1 wherein a bolt affixes a prong assembly to a tilt frame via a spacer, a washer and a roller, such that said tilt frame when affixed to said prong assembly permits said prong assembly to be raised and lowered, and wherein said tilt frame provides for assemblage of the remaining elements of the postionable, interchangeable blade assembly, which rotates about a pivot pin.

13. The water craft according to claim 12 wherein a base frame is connected to the tilt frame, thereby providing a base element to which a hydraulic cylinder is affixed to permit the tilt frame to be tilted up or down by expanding or contracting relative to the tilt frame and the base frame to which the hydraulic cylinder is attached.

14. The water craft according to claim 13 further comprising a hydraulic cylinder as a means for raising and lowering the positionable, interchangeable assembly.

15. The water craft according to claim 1 wherein cutter motors cause said cutter spindles to rotate, upon application of hydraulic power to the cutter motors.

16. The water craft according to claim 15, wherein said at least two vertically oriented cutter spindles comprise an arrangement of two to ten cutter spindles.

17. The water craft according to claim 16, wherein said arrangement of two to ten cutter spindles comprises six spindles arranged with four adjacent spindles being at the front-most aspect of the positionable, interchangeable blade assembly, such that plant matter first encounters cutter blades affixed to said four adjacent spindles.

18. The water craft according to claim 16 wherein the positionable, interchangeable blade assembly comprises a cutter motor, a rear cutter spindle and a forward cutter spindle, to which cutter blades are affixed by means of blade holders to which the blades are bolted or welded.

19. The water craft according to claim 18 wherein the blades on the anterior spindle are arranged as a combination of horizontal blades and diagonally arranged blades, and wherein in the blades on the rear spindle are all arranged diagonally, and included blades that extend above the water line or close to a bottom surface of an upper wall of a cutter housing during normal water craft operation.

20. The water craft according to claim 19 wherein the angle of inclination of the diagonally oriented blades is preferably between about 40 and 60 degrees from the vertical defined by the spindle.

21. The water craft according to claim 20 wherein said angle of inclination is about 50 degrees from the vertical.

22. The water craft according to claim 1, wherein said vertically oriented spindles comprise a series of clamps onto which are bolted intermeshed horizontal blades, hydraulic motors, motor mounting screws, and motor couplings.

23. The water craft according to claim 22, wherein said intermeshed horizontal blades comprise a blade having two leading surfaces machined to form a sharp, serrated cutting surface and a pair of trailing surfaces.

24. The water craft according to claim 23 wherein a pair of set screws is employed to affix the two halves of the blades to the spindles and screws are provided for bolting the assembled blades to the clamps.

25. The water craft according to claim 1 further comprising ancillary cutter means selected from compressed air and high-pressure water jets, wherein said ancillary cutter means are so located as to assist said array of cutting blades in mulching of solid matter.

26. The water craft according to claim 1 further comprising cutter assemblies on either or both sides of the water craft, to provide an expanded cutting width for the craft, wherein said side-mounted cutter assemblies are mounted at the approximate midpoint between the front and rear of the craft, and wherein said cutter assemblies on either or both sides of the water craft may be lifted, tilted and exchanged.

27. The water craft according to claim 1 comprising an engine which drives a hydraulic pump, which pumps hydraulic fluid through hydraulic lines, to said hydraulic spindle motors, and hydraulic lift and tilt positioning means for the positionable, interchangeable blade assembly.

28. The water craft according to claim 27 comprising an hydraulic oil-reservoir in a central location in the water craft, or a pair of hydraulic reservoirs disposed along the side and base of the craft, thereby permitting heat dissipation of the hydraulic oil through heat transfer to the water through which the craft is propelled.

29. The water craft according to claim 28 further comprising, in the hydraulic circuit, an air cooled radiator through which the hydraulic fluid is pumped.

30. The water craft according to claim 29 wherein the principal means for propulsion of the water craft is an air-propeller and wherein the significant draught created by the air-propeller is put to use by positioning said hydraulic radiator such that, as the propeller drives the craft forward, air that is drawn rearward by the propeller is forced to travel through the radiator.

31. The water craft according to claim 1 comprising a diesel engine motor.

32. The water craft according to claim 31 wherein said engine is cooled by means of a water-cooled or coolant-filled radiative means.

33. The water craft according to claim 1 wherein a single diesel engine is used to drive both an air-propeller and hydraulic cutter assembly.

34. The water craft according to claim 1 comprising an operator control station mounted on a platform which provides a clear vantage point for navigation of the craft and for control of each of the water-craft subsystems and which comprises central localization of the electrical and hydraulic controls to enhance efficient handling of the water craft and cutter blade assembly, both at the operator interface and at the hardware operational interface.

35. An improved water craft for reducing aquatic plant infestation, said water craft comprising:
   (a) a hull having an intake port at the bow end of the craft whereby aquatic plant laden water enters the craft;
   (b) an exhaust port whereby water and mulched aquatic plants are discharged; and
   (c) at least one array of cutting blades, rotatably disposed between said intake and said exhaust ports for mulching solid matter in the water passing from said intake port to said exhaust port;

wherein the improvement comprises at least one vertically-oriented cutter spindle and:
   (i) a positionable, interchangeable blade assembly disposed at said intake port and which is enabled to be raised, lowered, and tilted, said assembly configured to be interchanged in the water, by means of a flotation feature, for an alternate blade assembly;
   (ii) a cutter blade design comprising a staggered, angular configuration of cutter blades, an intermeshed horizontal blade configuration, or a horizontal, swivel-mounted configuration, or combinations thereof;
   (iii) a hydraulic system used to operate the cutter blades, including efficient aquatic plant infestation reduction through: cutter blade rotation between 500 and 4000 rpm via hydraulic motors, and placement of hydraulic oil reservoirs on either side of the water craft to facilitate cooling of said fluid;
   (iv) centralization of electrical and hydraulic controls at an operator interface facilitating efficient handling of the water craft and cutter blade assembly; and
   (v) a funnel or "V" shaped cutter assembly housing.

\* \* \* \* \*